Patented Jan. 23, 1951

2,539,377

UNITED STATES PATENT OFFICE 2,539,377

PROCESS FOR THE PRODUCTION OF STRAIN-FREE MASSES FROM CROSS-LINKED STYRENE-TYPE POLYMERS

Johann Josef Peter Staudinger, Ewell, and Henry Malcolm Hutchinson, Banstead, England, assignors to The Distillers Company Limited, Edinburgh, Scotland, a British company No Drawing. Application January 12, 1948, Serial No. 1,905. In Great Britain July 23, 1941

11 Claims. (Cl. 260—45.5)

This invention relates to the treatment of cross-linked polystyrenes and has as one object the production of thick thermoplastic masses free from strain and voids. A further object is the production of thick sheets or blocks of clear, bubble-free and strain-free material suitable for optical use.

It is known that, during the polymerisation of styrene and its lower homologues and nuclear chloro-substituted derivatives, shrinkage occurs irregularly and that, while thin sheets may be obtained free from bubbles and strain by polymerising the above-mentioned styrene compounds in shallow layers at elevated temperatures with or without the aid of a catalyst, the method fails with thicker layers and gives sheets exhibiting strain and containing numerous voids. In this connection, the incorporation of cross-linking agents, such as those described by Norrish and Brookman in "Proceedings of the Royal Society," 1937 163A, p. 205-220, into the styrene compounds confers no improvement.

It is also known to heat polystyrene under reflux or under pressure with a smaller quantity of a styrene compound, and it has been proposed to prepare hardened products by swelling a polyvinyl resin by the addition of a monomeric vinyl compound containing a cross-linking agent and then copolymerising the added materials. In these processes also, however, the material shrinks irregularly during polymerisation and subsequent cooling, setting up strains and frequently causing bubbles, which renders the product unsuitable for optical use.

Cross-linked polymers of styrene, its lower homologues and nuclear chlor-substituted derivatives, which are copolymers of the styrene compound and a cross-linking agent, are described by Norrish and Brookman in the above-mentioned paper, by Staudinger in U. S. Patent No. 2,089,444 and in "Berichte der deutschen chemischen Gesellschaft" 1934 67 p. 1164 and by others, and are available with any of a wide range of solubility characteristics. Those copolymers of the above-mentioned styrene compounds which are swollen by treatment with benzene but which are substantially insoluble are herein termed "swellable, insoluble cross-linked polystyrenes."

Cross-linking agents are well-known in the art, being compounds having a plurality of groupings in the molecule, each of which will confer the ability to undergo addition copolymerisation in the system in question, and divinyl benzene is a typical example for use in conjunction with styrene and numerous other polymerisable materials. Many other cross-linking agents are described in the paper by Norrish and Brookman, supra, and divinyl ether, divinyl sulphide, divinyl acetylene, acrylic anhydride, methacrylic anhydride, crotonic anhydride, the esters of polyhydric alcohols with acrylic acid, alphasubstituted acrylic acid or crotonic acid and the vinyl esters of dicarboxylic acids may be mentioned. It is to be understood that this is not a complete list of the cross-linking agents which may have been employed in the production of the available cross-linked polymerised styrene compounds, and the process of the present invention may be carried out with swellable insoluble cross-linked polystyrenes which have been prepared in a previous step with other cross-linking agents, or otherwise acquired.

The present invention provides a process for the formation of thick masses of void-free and strain-free material from smaller masses of swellable, insoluble cross-linked polystyrenes which consists in subjecting such masses to at least one cycle of operations comprising swelling in a normally liquid monomeric unsaturated polymerisable organic compound and thereafter polymerising the absorbed monomer by means of heat, with the aid of a polymerisation catalyst if desired.

In addition to the normally liquid unsaturated polymerisable organic compound, a cross-linking agent may be present in the swelling step, and said organic compound may itself be a cross-linking agent, or it may be a styrene-type compound identical with that forming the major part of the original cross-linked polymer. In the latter case, and in certain other cases, the resulting gel, on polymerisation, gives a resin which is not only strain-free and void-free but is of a transparency suitable for optical use, and a particularly useful method of polymerisation in such cases is to heat the gel while it is held between two sheets of plate glass.

When the original cross-linked polystyrene is immersed in the liquid monomer, the mass swells and absorbs considerable quantities of monomer, increasing in volume up to ten-fold or even more, depending on the degree of cross-linking, on the nature of the materials present and on whether the absorption is allowed to proceed to saturation. The product at this point is a gel, and is heated to polymerise the absorbed monomer. During the polymerisation, shrinkage takes place as in the case of un-cross-linked polystyrenes, but here the shrinkage is, surprisingly, uniform and does not result in the formation of strains or voids. In order to build up blocks of considerable thickness, the process may be repeated a number of times.

If it is desired to produce a void- and strain-free mass of a resin which is completely insoluble and almost non-swellable, the immersion liquid may be a mixture of a monomeric polymerisable organic compound and an appreciable amount of a cross-linking agent. The product in this case is much tougher, has a considerably higher softening point and can readily be machined.

A valuable feature of the optical blocks or plates which may be formed by the present process is that by varying the type of original copolymer, the type of soaking liquid and the type cross-linking agent (if any), a considerable range of optical characteristics may be obtained.

The following examples illustrate the manner in which the invention may be carried into effect.

Example 1

A clear, void-free copolymer prepared from 99.8 parts by volume of styrene and 0.2 part of divinyl benzene, having the form of sheets 4.5 mm. thick, was steeped in styrene and allowed to swell for 45 hours at 50° C. The resulting gels, which had increased in weight by 620%, were placed between glass plate and heated in an inert atmosphere to 120° C. until polymerisation was substantially complete. After removing the sheets from the glass plates, they were 8 mm. thick, highly transparent and strain- and void-free.

Example 2

A hard, bubble-free, 5 mm. thick sheet of a copolymer of 99.9 parts by volume of styrene with 0.1 part by volume of divinyl benzene was immersed in styrene at 25° C. The degree of swelling after various periods of time is shown in the following table:

| Time of immersion | Per cent weight increase | Approximate size |
|---|---|---|
| 1½ hours | 100 | 20 x 13 x 6 mm. |
| 20 hours | 470 | |
| 26½ hours | 560 | |
| 216 hours | 1,030 | 38 x 31 x 13 mm. |

The resulting gel was placed between two glass plates and the sandwich thus formed was heated to 110° C. for 3 days in a closed oven in which the air was replaced by nitrogen and which was kept saturated with styrene vapour. After removal of the glass plates, sheets of 12 mm. thickness were obtained.

This process was repeated with three sheets of styrene copolymers having different degrees of cross-linking, and the effect of this variation on the absorptive capacity for styrene is shown by the following table:

| Per cent of divinyl benzene in the original copolymer | Weight increase after immersion for 216 hours at 25° C. |
|---|---|
| 0.05 | 1,930 |
| 0.10 | 1,030 |
| 0.20 | 620 |
| 0.40 | 620 |

Example 3

A sheet similar to the one first used in Example 2 was immersed in a mixture of styrene and 0.4% of divinyl benzene, at 50–70° C. for a few hours and then at 25° C. for 3 days. At the end of this period, the weight had increased by 1150%, and the resulting soft slab was polymerised between glass plates for 29 hours at 115° C. in an inert atmosphere. After removal of the glass plates a clear, bubble-free sheet of 12½ mm. thickness was obtained.

Example 4

A sheet similar to that used in Example 3 was immersed in styrene containing 0.1% v./v. of divinyl benzene, at 25° C. for 48 hours, resulting in an increase in weight of 740%. Polymerisation was then effected between glass plates at 120° C. for 66 hours, and the cycle was repeated a number of times. The results are shown in the following table:

| No. of immersions | Time of immersion | Increase in weight in each cycle | Per cent weight of original sample |
|---|---|---|---|
| | Hours | Per cent | |
| 1 | 48 | 7.40 | 740 |
| 2 | 240 | 9.85 | 7,289 |
| 3 | 144 | 5.00 | 36,445 |
| 4 | 144 | 3.15 | 114,601 |
| 5 | 480 | 3.50 | 401,806 |

Example 5

A 4.5 mm. thick sheet of copolymer of 99.6 parts v./v. of styrene and 0.4 part of divinyl benzene was steeped for 63 hours at room temperature in methyl methacrylate, after which time the sheet had increased to 480% of its original weight, to form a fairly hard gel. The swollen slab was then polymerised between glass plates at 100° C. for 24 hours and gave a hard, transparent, strain- and void-free sheet of good thermal stability.

Example 6

A block of a copolymer of styrene with ½% by volume of crotonic anhydride was steeped in vinyl crotonate at laboratory temperature for four days, giving a clear gel having a weight four times greater than that of the original sheet. Polymerisation by heating at 150° C. for 24 hours resulted in a clear, tough resin.

Example 7

A block of polyvinyl xylene, cross-linked with 0.1% by volume of divinyl benzene, was steeped in vinyl xylene at laboratory temperature for 12 hours, gaining 450% in weight. The resulting gel was polymerised by heating between glass plates in the absence of air for 12 hours at 100° C. and for 10 hours at 180° C., to give a clear, transparent, strain-free resin.

Example 8

A block similar to that used in Example 3 was steeped in vinylidene chloride containing 0.2% by weight of benzoyl peroxide until the resulting gel had increased in weight by nearly 500%. The gel was then polymerised by heating in a closed vessel in the absence of air under a pressure of 5 atmospheres of nitrogen for 36 hours. The product was a tough resin.

Example 9

A block of a copolymer of p. chlorstyrene with 0.2% by volume of divinyl benzene was immersed in ethyl styrene until it had increased in weight by 500%. It was then heated in an atmosphere of nitrogen at 100° C. for 10 hours and then at 160° C. for 20 hours to give a clear, tough strain- and void-free resin.

Example 10

A sheet of a copolymer of styrene with 0.3% by volume of diallyl sebacate was immersed in a mixture of 65 parts of ethyl styrene and 35 parts of divinyl benzene at laboratory temperature. After 3 days the copolymer had swollen to a gel having increased in weight by 750% of the original. The gel was placed in a sealed sheet metal container and was heated for 3 hours at 100° C. and for 12 hours at 150° C. The product was a tough, clear, transparent resin and was practically non-swellable in benzene or styrene.

Example 11

A sheet of a copolymer of styrene with 0.36% by volume of ethylene glycol dimethacrylate was immersed in vinyl xylene at laboratory temperature for three days, after which time it had swollen to a gel weighing 390% of the original. This was wrapped in tin foil and heated at 130° C. in an oil bath for 24 hours. The product was a clear, white, tough resin.

Example 12

A block of polyethyl styrene, cross-linked with 0.1% by volume of divinyl benzene, was steeped in styrene until it had gained 900% in weight. Heating in a closed vessel in an atmosphere of nitrogen at 100° C. for 10 hours and then at 170° C. for 20 hours produced a clear, hard resin.

Example 13

A sheet of a copolymer of styrene with 0.7% by volume of divinyl benzene was steeped in diallyl adipate for three days at laboratory temperature. A clear gel resulted, weighing 300% of the original, and this was heated in a sealed container at 150° C. for 24 hours in the absence of oxygen. The product was a clear, tough resin.

This application is a continuation-in-part of our copending abandoned application, Serial No. 462,296, filed on October 16, 1942.

What we claim is:

1. A process for the formation of thick masses of void-free and strain-free synthetic resinous material from smaller masses of a swellable, insoluble cross-linked copolymer of a monomer selected from the group consisting of styrene, its nuclear methyl and ethyl substitution derivatives, and nuclear chlor-substitution derivatives with a copolymerisable cross-linking agent which is an ethylenically unsaturated comonomer which is copolymerisable with the styrene compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate, which consists in subjecting said smaller masses to at least one cycle of operations comprising swelling in a normally liquid monomeric unsaturated chain-polymerisable organic compound and thereafter polymerising the absorbed monomer by means of heat.

2. A process for the formation of thick transparent masses of void-free and strain-free synthetic resinous material from smaller masses of a swellable, insoluble cross-linked copolymer of a monomer selected from the group consisting of styrene, its nuclear methyl and ethyl substitution derivatives, and nuclear chlor-substitution derivatives with a copolymerisable cross-linking agent which is an ethylenically unsaturated comonomer which is copolymerisable with the styrene compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate, which consists in subjecting said smaller masses to at least one cycle of operations comprising swelling in a liquid selected from the group consisting of styrene, its nuclear methyl and ethyl substitution derivatives, and nuclear chlor-substitution derivatives and thereafter polymerising the absorbed liquid by means of heat.

3. A process according to claim 1, in which said normally liquid monomeric unsaturated polymerisable organic compound has added thereto a proportion of a copolymerisable cross-linking agent which is an ethylenically unsaturated comonomer which is copolymerisable with the styrene compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate.

4. A process according to claim 2, in which said liquid has added thereto a proportion of a copolymerisable cross-linking agent which is an ethylenically unsaturated comonomer which is copolymerisable with the styrene compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate.

5. A process for the formation of optical plates according to claim 2, in which the polymerisation is effected while the swollen mass is supported between glass sheets.

6. A process according to claim 1, in which the polymerising by means of heat is aided by a polymerisation catalyst.

7. A process according to claim 2, in which said monomer and said liquid are both styrene.

8. A process according to claim 2, in which said liquid has added thereto a proportion of a copolymerisable cross-linking agent which is an ethylenically unsaturated comonomer which is copolymerisable with the styrene compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate, and said monomer and said liquid are both styrene and said cross-linking agent is divinyl benzene.

9. A process according to claim 2, in which said monomer and said liquid are both p. chlorstyrene.

10. A process according to claim 2, in which said monomer is p. chlorstyrene and said liquid is styrene.

11. A process according to claim 2, in which said monomer is ethyl styrene and said liquid is styrene.

JOHANN JOSEF PETER STAUDINGER.
HENRY MALCOLM HUTCHINSON.

REFERENCES CITED

The following references are of record in the file of this patent:

UNITED STATES PATENTS

| Number | Name | Date |
|---|---|---|
| 1,683,401 | Ostromislensky | Sept. 4, 1928 |
| 2,089,444 | Staudinger | Aug. 10, 1937 |
| 2,234,993 | Vernon | Mar. 18, 1941 |
| 2,332,461 | Muskat | Oct. 19, 1943 |

FOREIGN PATENTS

| Number | Country | Date |
|---|---|---|
| 540,940 | Great Britain | Nov. 6, 1941 |

OTHER REFERENCES

Zapp: Ind. Eng. Chem., 40 pages 1508–1517 (Aug. 1948).

Norrish et al., Proc. Royal Society (London), vol. A 163, pages 205–220 (1937).